(12) United States Patent
Murphy et al.

(10) Patent No.: US 7,433,057 B2
(45) Date of Patent: Oct. 7, 2008

(54) METHOD FOR ACCURATE HIGH-RESOLUTION MEASUREMENTS OF ASPHERIC SURFACES

(75) Inventors: Paul E. Murphy, Rochester, NY (US); Dragisha Miladinovic, Deniston (AU); Greg W. Forbes, Sydney (AU); Gary M. DeVries, Fairport, NY (US); Jon F. Fleig, Rochester, NY (US)

(73) Assignee: QED Technologies International, Inc., Aurora, IL (US)

( * ) Notice: Subject to any disclaimer, the term of this patent is extended or adjusted under 35 U.S.C. 154(b) by 143 days.

(21) Appl. No.: 11/398,193

(22) Filed: Apr. 5, 2006

(65) Prior Publication Data

US 2006/0221350 A1    Oct. 5, 2006

Related U.S. Application Data

(60) Provisional application No. 60/668,385, filed on Apr. 5, 2005.

(51) Int. Cl.
G01B 11/24 (2006.01)

(52) U.S. Cl. ..................................... 356/601
(58) Field of Classification Search ................. 356/601, 356/239.7, 237.2–237.5, 512
See application file for complete search history.

(56) References Cited

U.S. PATENT DOCUMENTS

| | | | |
|---|---|---|---|
| 5,357,341 A | 10/1994 | Kuchel et al. | |
| 5,926,781 A * | 7/1999 | Scott | ............................ 702/151 |
| 6,061,133 A | 5/2000 | Freischlad | |
| 6,643,024 B2 | 11/2003 | Deck et al. | |
| 6,804,011 B2 * | 10/2004 | Kuechel | ....................... 356/512 |
| 6,956,657 B2 | 10/2005 | Golini et al. | |

OTHER PUBLICATIONS

J.C. Wyant, "Absolute Optical Testing: Better Accuracy Than the Reference", Photonics Spectra, p. 97-101, (Mar. 1991).
C. J. Evans and R. E. Parks, "Absolute Testing of Spherical Optics," Optical Fabrication and Testing Workshop, OSA Technical Digest, Series 13, p. 185-187, (1994).
P. Murphy, J. Fleig, G. Forbes and P. Dumas, "Novel Method for Computing Reference Wave Error in Optical Surface Metrology," SPIE vol. TD02, p. 138-140, (2003).

* cited by examiner

*Primary Examiner*—Tarifur R. Chowdhury
*Assistant Examiner*—Isiaka O Akanbi
(74) *Attorney, Agent, or Firm*—Neal L. Slifkin; Robert C. Brown (57) ABSTRACT

A system comprising a plurality of methods for measuring surfaces or wavefronts from a test part with greatly improved accuracy, particularly the higher spatial frequencies on aspheres. These methods involve multiple measurements of a test part. One of the methods involves calibration and control of the focusing components of a metrology gauge in order to avoid loss of resolution and accuracy when the test part is repositioned with respect to the gauge. Other methods extend conventional averaging methods for suppressing the higher spatial-frequency structure in the gauge's inherent slope-dependent inhomogeneous bias. One of these methods involve averages that suppress the part's higher spatial-frequency structure so that the gauge's bias can be disambiguated; another method directly suppresses the gauge's bias within the measurements. All of the methods can be used in conjunction in a variety of configurations that are tailored to specific geometries and tasks.

14 Claims, 10 Drawing Sheets

| ob (mm) | im (mm) |
|---|---|
| 79.558 | 3.25 |
| 91.3984 | 3.363 |
| 101.3984 | 3.451 |
| 111.3984 | 3.565 |
| 121.3984 | 3.671 |
| 131.3984 | 3.799 |
| 141.3984 | 3.93 |
| 151.3984 | 4.11 |
| 161.3984 | 4.26 |
| 171.3984 | 4.471 |
| 181.3984 | 4.699 |

$$\frac{1}{f} = \frac{1}{ob + ob\_ref} + \frac{1}{im + im\_ref}$$

$f = 22.4046$ $ob\_ref = -349.795$ $im\_ref = 21.4145$

Table 1: example of measured object and focus axis position pairs.

"ob" is measured with respect to object reference point 29, the apex of the transmission sphere reference surface "im" is the position of the focusing axis F with respect to its mechanical origin.

FIG. 7c $$sag(r) = \frac{c\, r^2}{1 + \sqrt{1 - c^2\, r^2}} + a_d\, r^4$$

where: "c" = $\frac{1}{100\text{ mm}}$ and "ad" = $\frac{-1}{1000000\text{ mm}}$

FIG. 7d

Local surface chracteristics
(as a function of local position 'r' on the surface, measured from the axis of symmetry, in mm)

*sphere whose surface passes through both the center and the edge of the asphere

METHOD FOR ACCURATE HIGH-RESOLUTION MEASUREMENTS OF ASPHERIC SURFACES

This application claims benefit of pending U.S. Provisional Application No. 60/668,385 filed Apr. 5, 2005.

BACKGROUND OF THE INVENTION

1. Field of the Invention

The present invention relates to methods and apparatus for surface and wavefront measurements; more particularly to automated setup, calibration, and acquisition of such measurements; and most particularly, to such methods that improve the accuracy of aspheric surface and wavefront measurements.

2. Discussion of the Related Art

Methods and apparatus for making precision measurements of surfaces and optical wavefronts are well known in the prior art. The preferred devices for obtaining optical-quality measurements are (unsurprisingly) based on optical technology. The most widely accepted metrology instruments in this field are based on the principle of interferometry, though some other technologies are applicable.

Such equipment has demonstrated capability to obtain measurements of exceptional accuracy. A contour map of a part surface of ~100 mm diameter can be obtained accurately to 10 nanometers or so (between one-tenth and one-hundredth of a wavelength of visible light) by using a Fizeau interferometer or the like. Microscope-based interferometers (e.g. those based on a scanning white-light technology) can accurately measure the height of features to better than a nanometer over ~1 mm diameter area. The capability of Fizeau and microscope interferometers has been sufficient for all but the most demanding applications. As time goes on, however, application requirements have become more stringent. For example, optical lithography has exacting scattering ("flare") requirements. These require sub-nanometer accuracy measurements over a range of spatial frequencies that includes the band from 0.1 to 10 $mm^{-1}$. This band is on the high end of a Fizeau interferometer's lateral resolution capability, but on the low end of an interference microscope.

Commercially available interference microscopes can achieve the height accuracy (or nearly so) of the present application, but lack the lateral range required. The use of a lower-magnification microscope objective increases the lateral range, but this method is effective only for flat (or nearly flat) surfaces. Curved surfaces (either spherical or aspherical) cannot be measured, due to their large deviation from the instrument's reference surface (curved part vs. flat reference).

Commercially available Fizeau interferometers can easily achieve the lateral range. To achieve the necessary resolution (~100 micrometers), however, the interferometer requires more magnification than is usual. Relatively straightforward optical design modifications can address this issue. A more significant challenge is related to the height accuracy of a Fizeau interferometer, which is usually inferior to that of an interference microscope. The primary factors contributing to the lesser accuracy are the greater coherence of the light, the inability to precisely focus on the test surface, and the greater difficulty calibrating systematic errors. Innovations are needed to enhance the current state of the art. The associated challenges are far more demanding when the surfaces to be measured are aspheric.

As the coherence of the gauge light source increases, the resulting measurements become more sensitive to defects such as scratches, dust particles, speckle, and ghost reflections. Such defects can degrade measurement repeatability and also introduce systematic errors (biases). Various techniques exist in the prior art for effectively reducing the light source coherence to reduce such errors without unduly degrading the performance in other ways. See, for example, U.S. Pat. No. 5,357,341 to Kuechel; U.S. Pat. No. 6,061,133 to Freischlad; and U.S. Pat. No. 6,643,024 to Deck et al. These techniques, however, make the system more sensitive to focusing errors. Furthermore, the resolution of higher spatial frequency surface features is also more sensitive to focusing errors. Thus proper focusing of the measurement system has become very important.

The best focus position depends on the interferometer optics and the radius of curvature of the test part. For a given spherical (or plano) test part, these parameters change only when the interferometer optics are changed. This typically does not occur when testing a part, so the interferometer operator can usually set the focus manually with enough precision to obtain an adequate measurement. Aspheres, however, have two local principal radii of curvature that vary depending on which portion of the aspheric surface is being examined. For any given portion, there is therefore some freedom in designating a nominal radius to test against. The changing nominal radius of curvature means that the optimal test location (with respect to the optics of the interferometer) changes. This change in test object location (conjugate) means that the position of best focus also changes. For aspheres, therefore, the best focus position for the interferometer depends on which portion of the surface is currently being measured.

The prior art method of user-adjusted focus is insufficient to achieve automatic measurements at multiple points on a test asphere (i.e. without the user needing to refocus manually between measurements). An automatic focusing mechanism would also improve measurement reproducibility, since variation in an operator's manual focusing technique would be eliminated. Other devices (such as photographic cameras) employ autofocusing technologies, but these are not directly applicable to the measurement of optical surfaces. So-called 'passive' methods rely on optimizing the contrast of structure in the image. Since optical surfaces in general do not have significant surface structure, i.e. they are very smooth, such methods fail (much as they do when trying to focus on any feature-less target, such as a cloudless sky). 'Active' autofocusing methods, however, measure the distance to the target with some auxiliary instrumentation, and use knowledge of the optical system to compute the necessary focal position. Although this basic principle is applicable to a wavefront-measuring gauge, there are areas for potential improvement. Since a wavefront measuring gauge already emits illumination (and detects reflected light) as part of its basic function, a means for employing this for the purposes of measuring distance instead of employing an additional system is desirable. Furthermore, the precise optical characteristics of a wavefront-measuring gauge may not be well known. (For example, it may use commercially available lens subassemblies whose precise designs are proprietary.) Thus a method for calibrating the optical parameters of the gauge as they pertain to focus would be a significant improvement.

The calibration of systematic errors with higher spatial frequencies is also an area where improvement is needed. The reference wavefront error (a spatially dependent height bias in the measurement) is a significant accuracy limitation. Several techniques exist in the prior art for calibrating such errors, including two-sphere, random ball, and subaperture stitching with interlocked compensators. See, for example, J. C. Wyant, "Absolute optical testing: better accuracy than the reference", Photonics Spectra, March 1991, 97-101; C. J. Evans and R. E. Parks, "Absolute testing of spherical optics", Optical fabrication and Testing Workshop, OSA Technical Digest Series 13, 185-187 (1994); and P. Murphy, J. Fleig, G. Forbes, and P. Dumas, "Novel method for computing reference wave error in optical surface metrology", SPIE Vol. TD02, 138-140, 2003. None of these methods, however, is suitable for extreme accuracy calibrations of higher-resolution features in the reference wavefront. High spatial frequency wavefront features evolve more quickly when propagating through space than those of low spatial frequency. Thus it is important to calibrate such features at the conjugate position at which the test optic will be measured; otherwise the estimate of the higher spatial frequency content in the reference wavefront will be inaccurate. For example, a ball calibration executed on a sphere with a 50 mm diameter will not accurately calibrate the higher spatial frequencies for a test part with a 200 mm radius of curvature. The radius of curvatures of the calibration and test part are significantly different, and therefore the higher spatial frequency content of the reference wavefront error will also differ.

For spherical test parts, the ball technique can be adapted to accurately calibrate higher spatial frequencies in the reference by simply executing the calibration on a part of approximately the same radius as the test part, or by executing the calibration on the test part itself. The part is likely a section of a sphere (rather than a complete ball), but it will work for this purpose if its size exceeds the measurement area by some margin (approximately the longest spatial wavelength of interest, provided the surface structure is not unduly spatially correlated). If a complete sphere is not used for the calibration, the averaging technique will not necessary converge to the correct value of the reference wavefront, due to spatial correlation in the part's surface profile. This correlation, however, rarely extends to the higher spatial frequencies, allowing them to be calibrated adequately using a part that is not a full sphere. Note that in cases where the lower spatial frequencies are also important, the method that involves subaperture stitching with interlocked compensators will work in tandem with a non-ball average to enable accurate characterization of the reference wave over all measurable spatial frequencies. This stitching technique is not, however, generally applicable to aspheric surfaces. Alternative methods are thus required to obtain calibrations of higher spatial frequency wavefront error on aspheres.

What is needed in the art, therefore, is a method for automatically setting the measurement device focus position, and preferably a method wherein relatively little knowledge of the actual focusing optics is needed.

What is further needed in the art is a method for calibrating or otherwise reducing the systematic errors of the measurement device, particularly those with higher spatial frequencies, when measuring aspheric surfaces.

It is a primary object of the present invention to enable automatic focusing of a metrology system on a test surface when its local radius of curvature is known.

It is a further object of the present invention to improve a wavefront measuring gauge's accuracy, particularly for aspheric surfaces and higher spatial frequencies.

SUMMARY OF THE INVENTION

Briefly described, the present invention provides methods for improving the measurement accuracy of a metrology system comprising a machine including multi-axis part-positioning means and an embedded wavefront-measuring gauge. These methods include steps for calibrating the focusing characteristics of an unknown optical system; setting the focus automatically with knowledge of only the test part's nominal local radius of curvature; calibrating the reference wave bias for aspheric wavefronts; and reduction of the effect of uncalibrated errors. These accuracy-improving methods are primarily applicable to higher spatial frequencies (more than a few undulations across the test part) on aspheric surfaces.

One aspect of the present invention is the calibration of the wavefront-measuring gauge's focusing characteristics. A priori knowledge of the imaging system is not required. The results of this one-time calibration, coupled with knowledge of the test part's nominal local radius of curvature in the measurement area, enable automatic focusing.

A second aspect of the present invention is a variation of the prior art random-average technique that can be applied to aspheric wavefront measurements for cases with some underlying symmetry, (perhaps rotational as in spheroid, toroid, etc.), herein referred to as "ring averaging". Since the systematic wavefront error varies with the profile measured, a calibration performed in a spherical null test configuration will not be applicable to an aspheric non-null test. Restricting the measurements to average, however, to those where the nominal shape is identical provides an estimate of the systematic wavefront error confounded with the aspheric shape and the symmetric part error on that ring.

A third aspect of the present invention is another variation of the random-average technique that averages over wavefront slope in addition to space. There is a wavefront error component that depends on the slope of the measured wavefront (which is why a pure random average is ineffective for aspheric tests). Measuring the same location of a test part, but with different slope distributions (achieved, for example, by slightly tilting the test part), allows such slope-dependent errors to be reduced with averaging along with the usual spatially dependent reference wave biases.

A fourth aspect of the present invention suppresses the effects of low-spatial-frequency errors in the mid-spatial frequency band of a stitched measurement. When stitching, any low-spatial frequency errors will tend to induce stitching artifacts (e.g. steps at the subaperture edges) in the stitched result. Such edges have significant higher spatial frequency components, and thus low-frequency errors can corrupt the characterization of higher spatial frequencies. Eliminating the low spatial frequency components prior to stitching (by fitting or filtering them out) or actually optimizing them as compensators in the stitching can reduce the higher frequency corruption.

Applying various aspects of the present invention, either together or in part, provides improved measurement accuracy, particularly for measurements of higher spatial frequency structure on aspheres, as compared to the prior art.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

The present invention provides methods for improving the measurement accuracy of a metrology system comprising a machine including multi-axis part-positioning means and an embedded wavefront-measuring gauge, e.g. a Fizeau interferometer. These methods reduce the error contributions of systematic errors in the gauge wavefront, particularly higher spatial frequency errors (more than a few undulations across the test part) in aspheric wavefronts.

Figure 1:
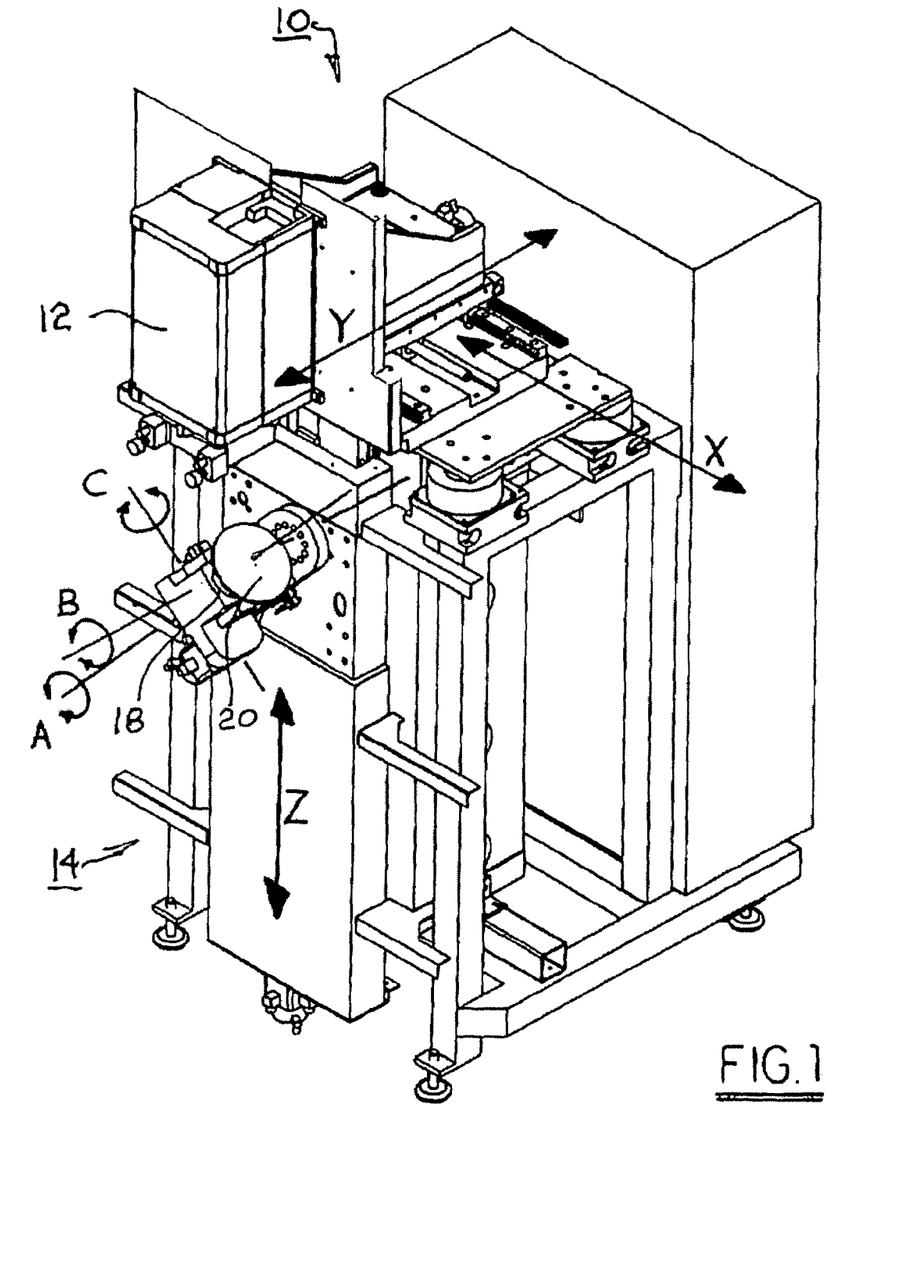
FIG. 1 is an isometric view of a multi-axis metrology system in accordance with the invention.
Figure 2A:
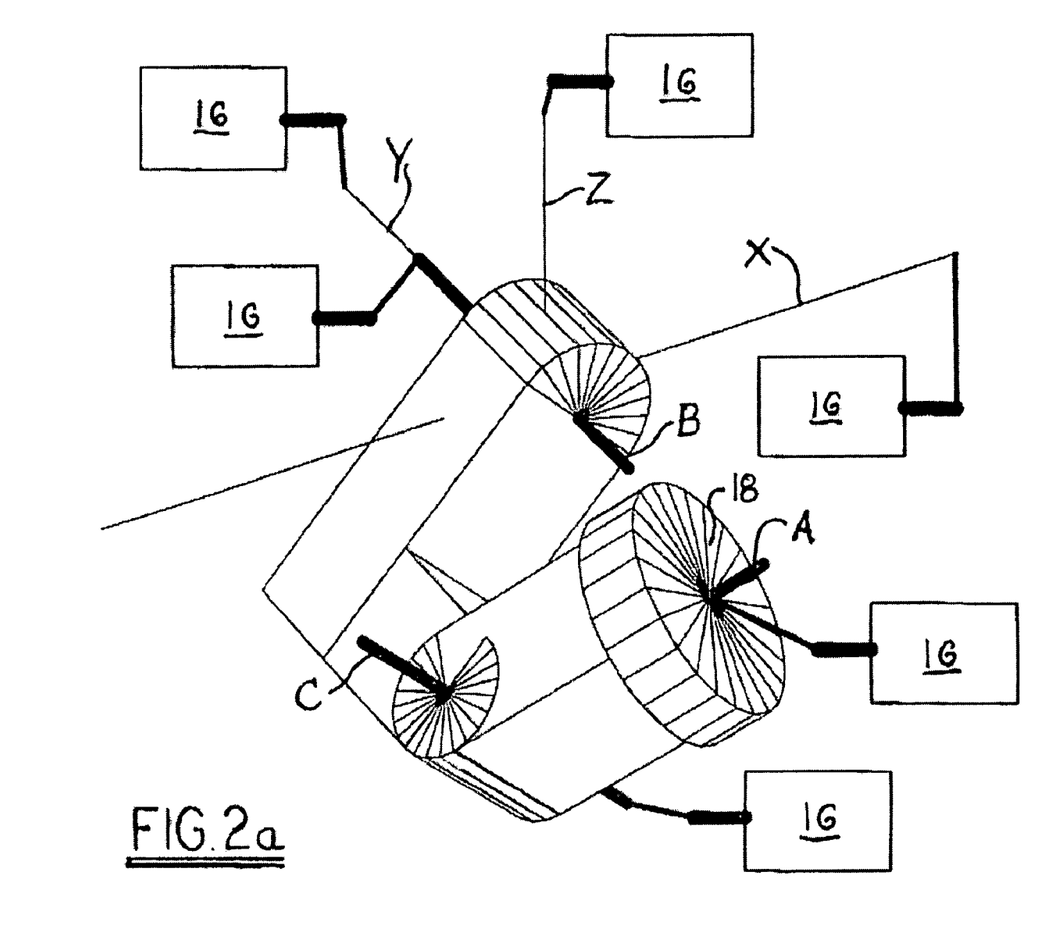
FIG. 2a is a schematic isometric depiction of the six axes embodied in the instrument shown in FIG. 1.
Figure 2B:
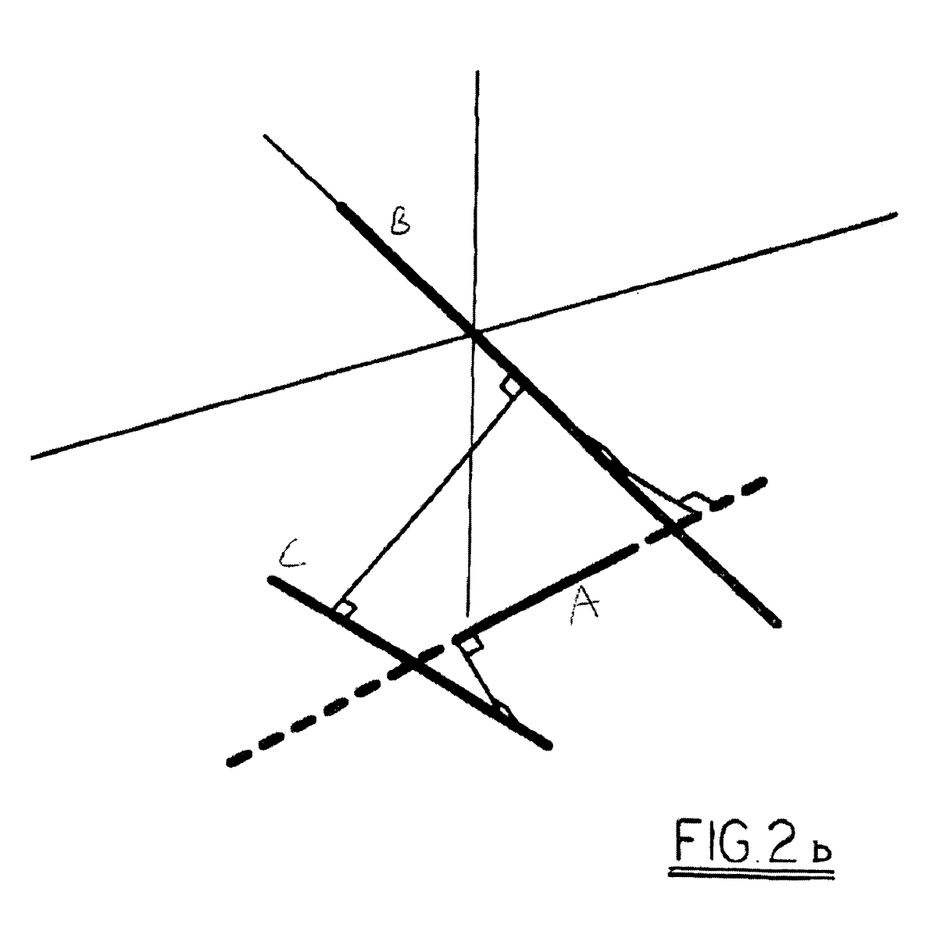
FIG. 2b is a schematic isometric depiction of the offsets between the rotational axes of the instrument shown in FIG. 1.

Referring to FIGS. 1 and 2, a metrology system 10 in accordance with the invention includes a wavefront gauge 12, for example, an interferometer, mounted to ("embedded" in) a multi-axis machine 14 defining a workstation having a stage 18 for receiving and moving a test part 20 during measurement thereof. A configuration of machine motions is shown (FIG. 2a) wherein there are six mechanical axes; three for translation (X, Y, Z) and three for rotation (A, B, C). It should be understood that other configurations of axes (including a different number and/or ordering of the axes) are possible within the scope of this invention. Motion in each of these six axes is independently controllable by, for example, an actuator 16 such as a stepper motor assembly having conventional mounting and gearing. All of the mechanical axes may be under either automatic or manual control. The type of control is not an essential part of the process.

Figure 3:
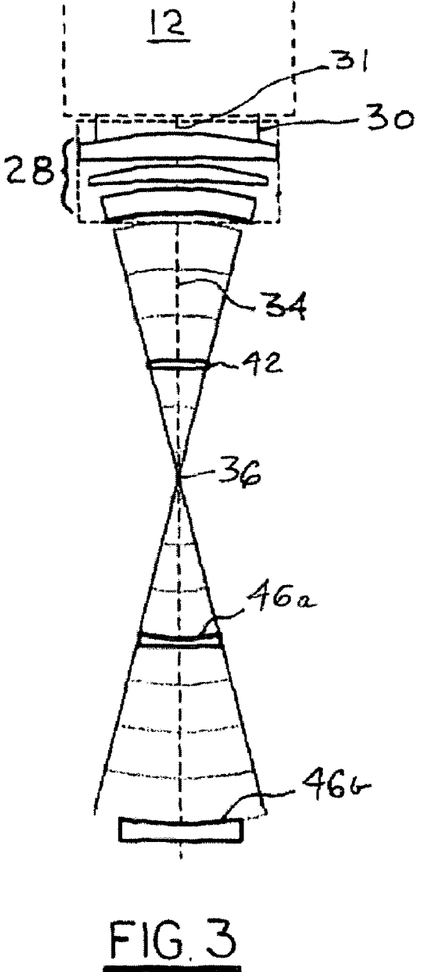
FIG. 3 is a schematic diagram showing confocal/null positioning of various spherical test parts (FIGS. 3a-3c), wherein the test parts are positioned such that the nominal center of curvature of the test surface is closely matched to the center of the spherical wavefront emerging from the embedded gauge.
Figures 3A, 3B:
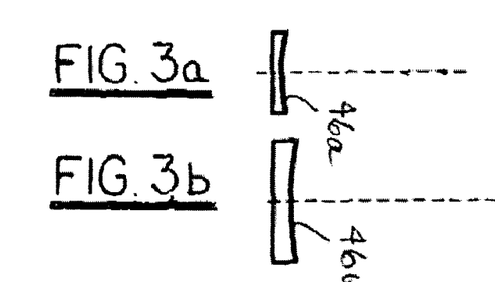
Figure 3C:
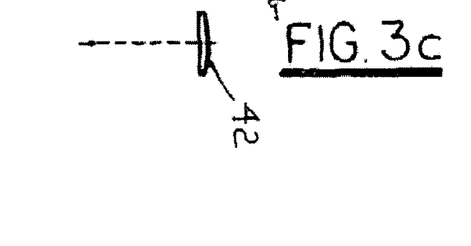
Figure 4:
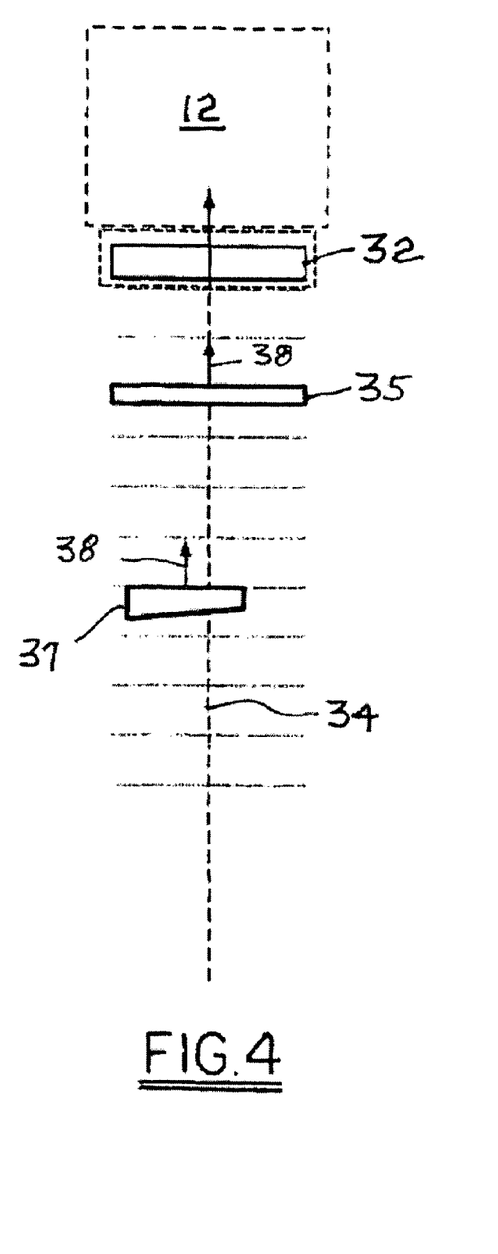
FIG. 4 is a schematic diagram showing positioning of various planar test parts (FIGS. 4a-4b) in a collimated optical field emitted by an embedded gauge, wherein the test parts are positioned such that the part surface normals are parallel with the direction of propagation of the field.
Figure 4A:
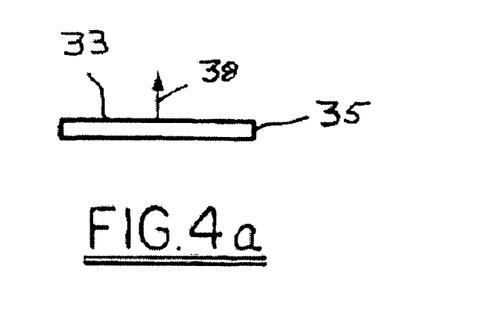
Figure 4B:
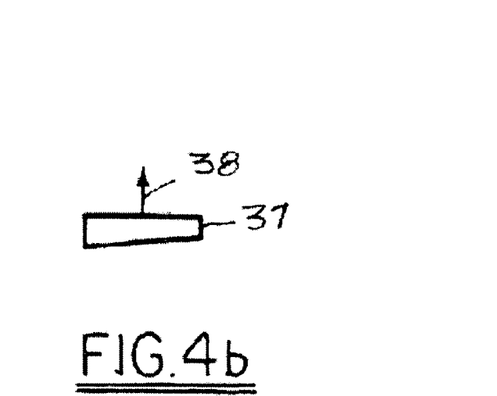
Figure 7A:
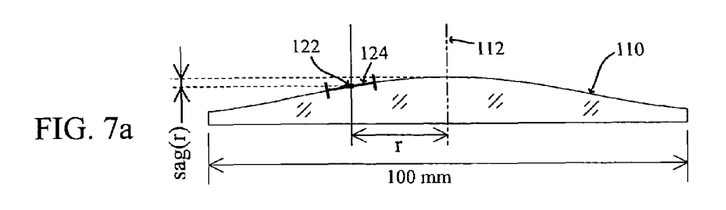
FIG. 7a is a diagram of an example rotationally symmetric asphere and a sample subaperture measurement region, as viewed perpendicular to its axis of symmetry (side view)

As shown in FIG. 3, the machine axes must position a test part such that the focus 36 of the embedded gauge wavefront nominally coincides with the center of curvature of any particular section of a non-planar test part surface (or in the case of a nominally planar part, the direction of propagation 34 of the gauge wavefront is to be nominally parallel to the test surface normal 38). This is referred to herein as the surface "confocal" position. The confocal position is also often referred to as a "null", meaning that the wavefront re-entering the gauge is similar or identical to the wavefront that exited the gauge for the test. FIG. 4 shows the case for a nominally flat test part. Note that most areas of an aspherical surface do not have a unique null or confocal position when tested with either a spherical or planar wavefront. They do, however, have a position that most closely approximates confocal (though the exact position depends somewhat on the definition of "closely" that is used; minimum mean-square wavefront deviation and minimum peak wavefront slope difference are two examples). See FIG. 7 for a diagram of an example aspheric surface. FIG. 8b illustrates the variation of local radius of curvature of the aspheric surface, as well as the curvature 132 that most closely approximates a confocal position for testing 20 mm away from the axis of symmetry (diagrammed in FIG. 7d).

Figure 5:
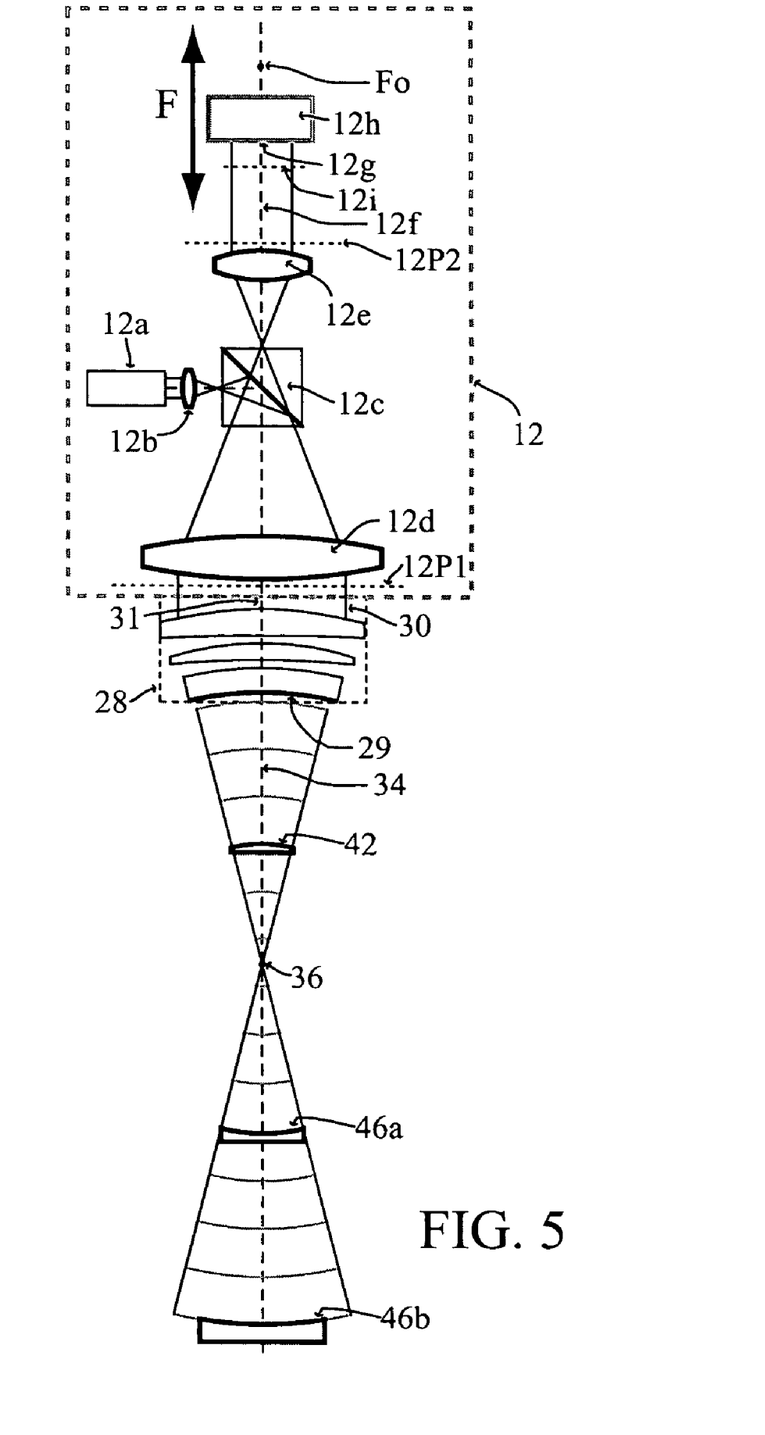
FIG. 5 is a sample internal diagram of a wavefront-measuring gauge including focusing stage ("F" axis)

The wavefront gauge 12 preferentially includes a (possibly computer-controlled) mechanism for setting the position of the gauge image plane (focusing stage, referred to herein as the "F" axis). FIG. 5 details an exemplary Fizeau interferometer configuration including such an F axis. The light source 12a emits a beam of light that is focused by lens 12b, which is then partially reflected by beamsplitter 12c (the light partially transmitted through beamsplitter 12c is typically ignored) and then collimated by lens 12d. The light is then transmitted through a transmission sphere 28 or transmission flat 32. For transmission spheres, it is preferred that the gauge internal optical axis 31 be mutually parallel with both the gauge external optical axis 34 and the Z-axis travel direction. The last surface of the transmission sphere, reference surface 29, is aligned such that its radius of curvature matches that of the incident wavefront at that plane. Some of the light is transmitted, converging to a point 36, while the rest of the light is reflected back into the gauge (the "reference wavefront"). The transmitted light then reflects from a test surface (such as 42, 46a, or 46b, for example) and reenters the gauge (the "test wavefront"). Both the reference and test wavefronts pass back through lens 12d and are partially transmitted through beamsplitter 12c (this time, the light partially reflected from beamsplitter 12c is typically ignored). The light then passes through lens 12e, which is preferably chosen to collimate the light (making the system telecentric in image space). A plane 12i is nominally conjugate to the test surface after passing through all the optics. The focusing axis F provides the means to move gauge detector plane 12g onto 12i, along an axis nominally parallel to optical axis 12f, thereby achieving the optimal focus for the particular test surface. Two physical examples of gauge detector planes 12g include CCD imaging arrays (which would include other video electronics in package 12h) and diffuser disks (which would include additional relay imaging optics in package 12h).

As a rule, in the prior art, wavefront-measuring gauges are optical systems, whose optics image wavefronts onto some plane of detection (where the intensity and/or phase of the wavefront is recorded). Such gauges usually require placing the surface (or optical system) under test a specific distance from the gauge as shown in FIG. 3. The distance depends on both the gauge's optics as well as the test surface's radius of curvature; the confocal position is at a distance equal to the surface radius of curvature away from gauge point focus 36. Therefore different test surfaces with different radii, such as 42, 46a, and 46b, are placed at different distances from the gauge (and have different object conjugates). The optimal location of the gauge detection plane (12g coincident with image conjugate 12i) changes as a result, usually in accordance with $$\frac{1}{obj} + \frac{1}{img} = \frac{1}{f} \qquad \text{Equation 1}$$

where "obj" is the displacement from the test surface to the gauge's first principal plane 12P1, "img" is the displacement from the gauge's rear principal plane 12P2 to the image plane (i.e. optimal location of the detection plane), and "f" is the focal length of the gauge's optical system.

Usually, the gauge operator manually (and visually) adjusts the detection plane 12g (and thus "img") to achieve the sharpest image for a given test configuration (12g coincident with test surface image conjugate 12i). This typically requires a physical edge or some other high-contrast feature (e.g. the part edge, or a piece of paper inserted into the gauge wavefront to temporarily provide an edge to focus on) for the operator to discern when the best focus has been achieved. Thus the prior art method of focusing does not require knowledge of the object location, gauge focal length, or gauge principal plane locations.

An automated focusing system in accordance with the present invention is a significant improvement over the prior art in wavefront-measuring gauges. The present invention builds on the basic concept of so-called "active" autofocusing systems, but with two key refinements:

1. the present invention is self-calibrating, and thus knowledge of the gauge optical design is not needed; and
2. it employs a priori knowledge of the test part's nominal local radius of curvature to calculate the object distance, avoiding the need for an additional rangefinding mechanism.

The present invention does not assume detailed knowledge of the gauge optical system, and thus Equation 1 cannot be utilized "as is". Instead, the model employed in the present invention is given by Equation 2:

$$\frac{1}{ob + \text{ob\_ref}} + \frac{1}{im + \text{im\_ref}} = \frac{1}{f} \qquad \text{Equation 2}$$

where,

"ob_ref" is the offset from a reference point (known, such as the apex of the reference surface 29, or point 36) to the first principal plane 12P1 (unknown, and constant);

"ob" is the displacement from the test surface to the object reference point (known, and dependent on the test part's nominal local radius of curvature);

"im_ref" is the displacement from F-axis mechanical origin Fo to the second principal plane 12P2 (unknown, and constant);

"im" is the position of the F-axis (this is a variable parameter that, in general, we are trying to set properly);

"f" is the focal length of the gauge's optical system (unknown, and constant for a given set of gauge optics).

The constant unknown parameters are calibrated through use of a method in accordance with the present invention.

Figure 6:
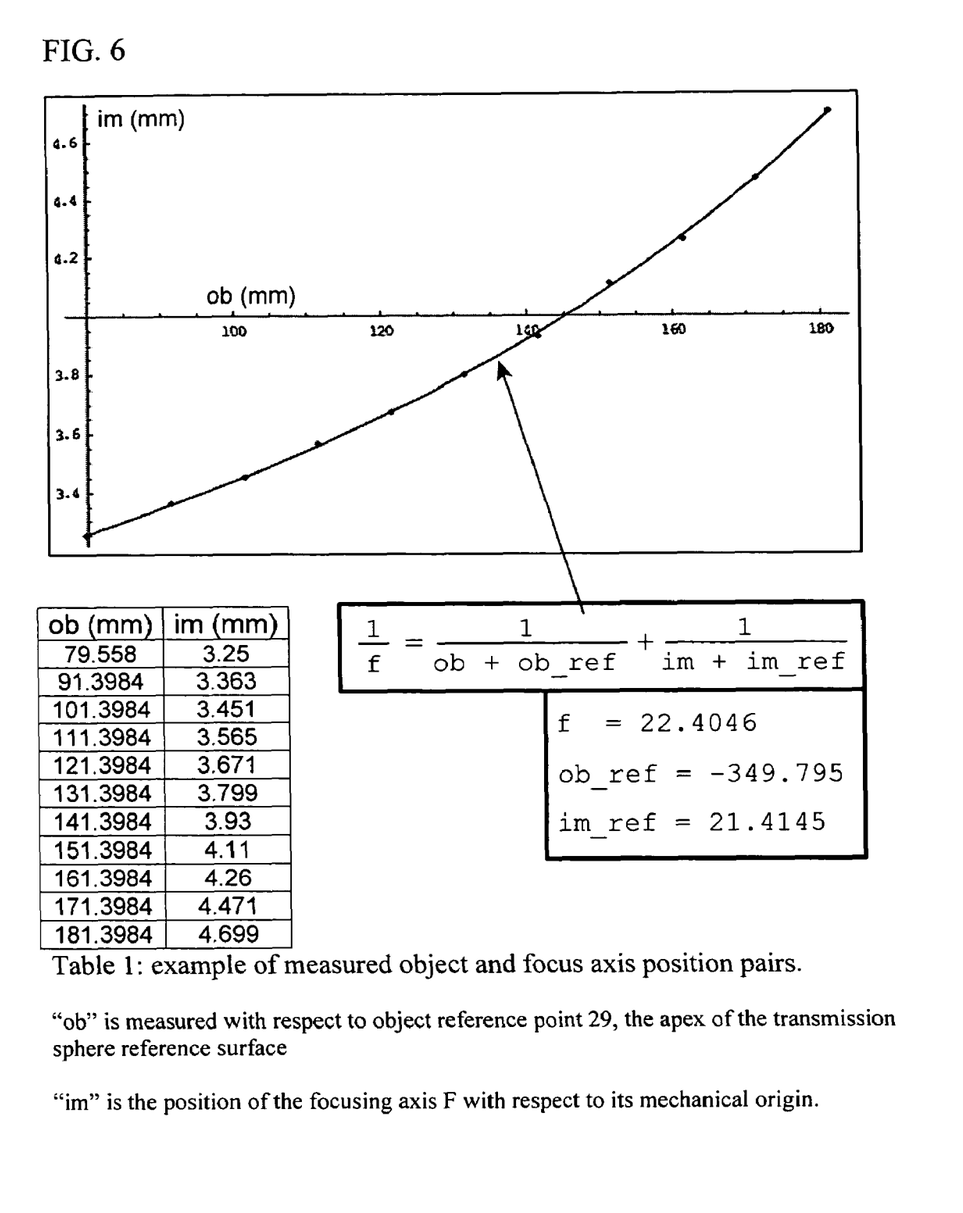
FIG. 6 is a graph showing an exemplary determination of focus parameter calibration and data fitting, using real data.

The parameters to calibrate include "ob_ref", "im_ref", and "f". The calibration requires testing one or more parts at several different conjugate positions. The method of calibration comprises the steps of:

1. setting the gauge in the desired optical configuration;
2. collecting data at a plurality of different object and F-axis positions, employing the following sub-steps to obtain data at each pair of positions;
   a. set up a part of known radius (e.g. mount it on the workstation and align it to the gauge wavefront; the alignment may include a known Z offset),
   b. adjust the F-axis position until the surface is in sharp visual focus (employing auxiliary alignment aids, such as small slips of paper, as desired),
   c. record the position of the F-axis and object positions (note that the object position is with respect to the object reference point);
3. performing a fitting calculation (using, for example, a nonlinear least-squares fitting algorithm) on the plurality of object and F-axis position pairs, optimizing the fit using "ob_ref", "im_ref", and "f" as degrees of freedom. See, for example, FIG. 6 wherein the apex of reference surface 29 is the object reference point.

After the completion of these steps, the 3 constant parameters are now known. Therefore the F-axis position that achieves optimal focus can be calculated with knowledge of "ob" (which is known once the test part's nominal local radius of curvature is designated). Focusing the gauge in this fashion improves the performance of the system, most particularly for higher-spatial frequencies present on aspheric wavefronts.

Further improvement of measurement accuracy is possible by either calibrating or averaging out systematic biases in the wavefront measurements. The prior art is largely adequate in this regard for null measurements of spherical surfaces. A known method, herein termed "random average", is particularly useful for characterizing higher spatial frequency biases in a wavefront-measuring gauge. Simply stated, the prior art average method involves the following steps:

1. choosing a calibration part whose lateral extent is greater than that of the wavefront-measuring gauge and whose radius is as close as possible as that of the test part (in fact the test part can often be used as the calibration part);

2. mounting the calibration part in a system that includes multi-axis part positioning means and the wavefront-measuring gauge, and moving the part to its confocal position;
3. acquiring a plurality of measurements at different positions on the calibration part surface (which measurements should still be at the confocal position); note that the systematic error will be the same in each measurement while any deviations on the part or other noise will vary from measurement to measurement;
4. averaging the measurements together, thereby forming an estimate of the systematic gauge wavefront error under the present test conditions.

The prior art average technique relies on the systematic error being substantially the same across different measurement locations on the part, as well as the part error being uncorrelated over some spatial band of interest (and therefore its average tends toward zero). But note that the systematic error generally varies as a function of the local slope in the individual measurements. A spherical part typically has no such slope variation across the measurements, so they tend to obey the requirement that the wavefront bias be invariant with part position. Aspheric measurements, however, fail to meet this criterion in general (see FIG. 8d for an example of slope variation across an aspheric surface), and thus a standard implementation of the prior art random average method fails to provide an adequate calibration.

Figures 7C, 7D:
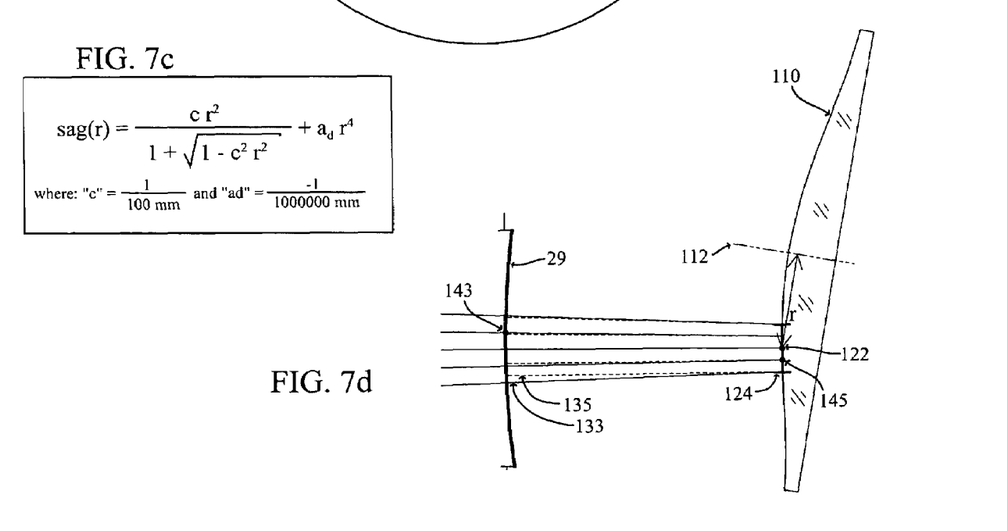
FIG. 7c is a mathematical description of the sag of the example asphere, wherein 'r' is the distance from the axis of rotational symmetry.
FIG. 7d is a view of the example asphere, positioned with respect to a wavefront-measuring gauge to optimally view the sample subaperture measurement region.
Figure 8A:
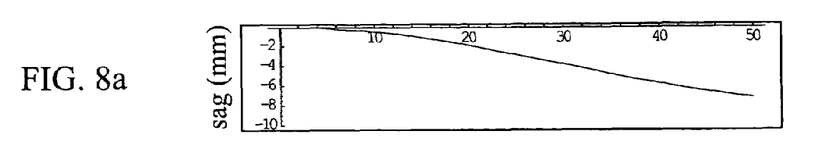
FIG. 8a is a graph of the sample asphere's sag (deviation measured from the tangent plane at the part's apex in the direction parallel to its axis of symmetry) as a function of the surface point's distance 'r' from the axis of symmetry.
Figure 8B:
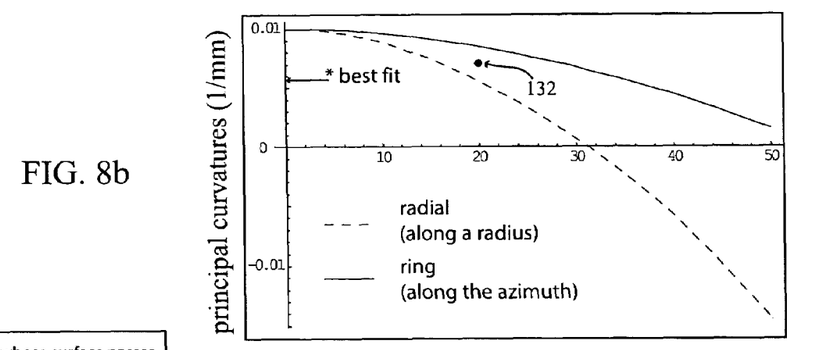
FIG. 8b is a graph of the sample asphere's local principal curvatures as a function of 'r': the 'tangential' principal curvature is measured in the plane containing the axis of symmetry and the surface normal at the particular surface point, whereas the 'sagittal' principal curvature is measured in a plane that contains the surface normal but is orthogonal to the plane used for radial curvature.
Figure 8C:
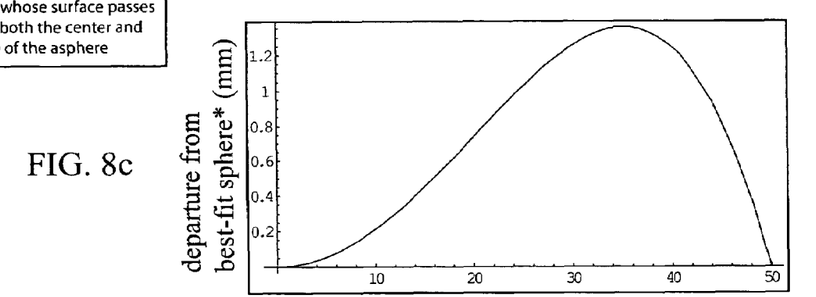
FIG. 8c is a graph of the sample asphere's departure from a best-fit sphere as a function of 'r', wherein the surface of the best-fit sphere passes through both the center and the edge of the asphere surface.
Figure 8D:
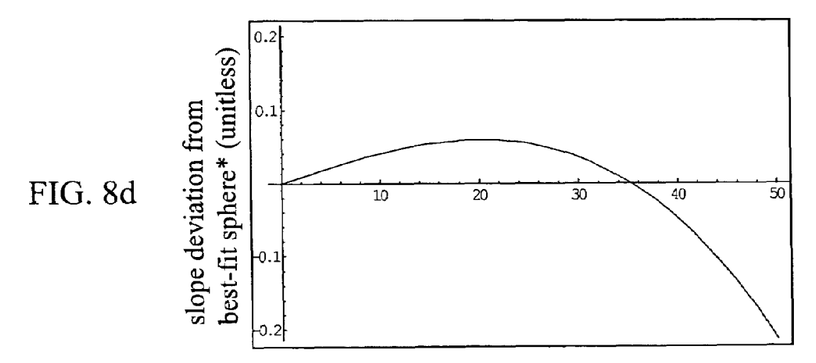
FIG. 8d is a graph of the difference in slope between the asphere and the best-fit sphere as a function of 'r'.
Figure 9A:
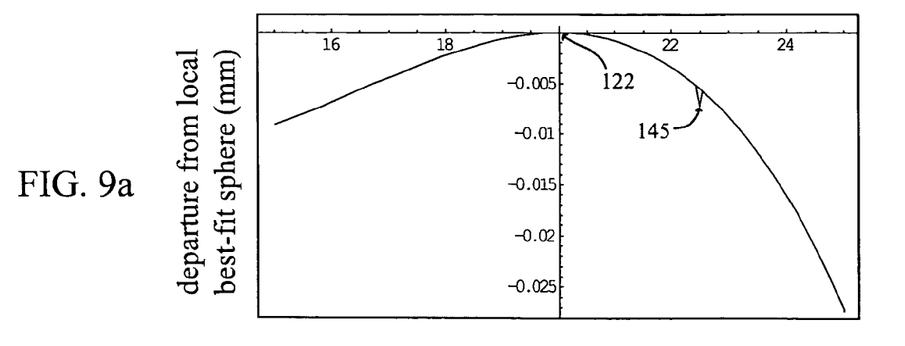
FIG. 9a is a graph of the sample asphere's departure from a reference sphere centered 20 mm away from the aspheric axis over a 10 mm diameter region wherein the curvature of the reference sphere is the average of the local radial and ring curvatures at 20 mm off axis, perfect except for a local surface defect with an exaggerated vertical scale.
Figures 9B, 9C:
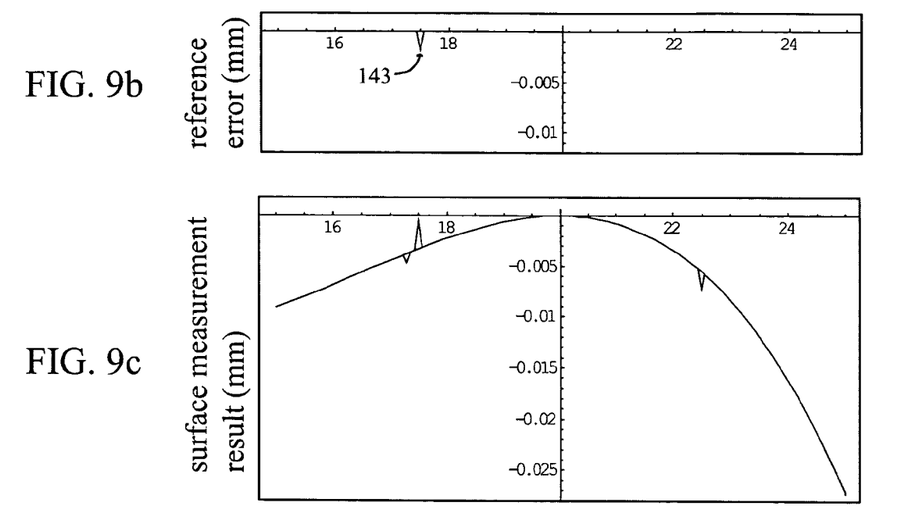
FIG. 9b is a graph of the reference surface deviation from a sphere, perfect except for a single local defect with exaggerated vertical scale.
FIG. 9c is a sample measurement obtained by testing the surface shown in FIG. 9a against the reference shown in FIG. 9b, using the sample test setup shown in FIG. 7d.

The present invention is based upon this fundamental averaging method, but presents novel ways of applying averaging techniques to aspheric surface and wavefront measurements. One such novel averaging method, termed the "ring average" method herein, can be applied to aspheres with some underlying symmetry. Consider, for example, a rotationally symmetric aspheric shape 110 shown in FIG. 7a (mathematical description given in FIG. 7c). Consider a measuring region 124 centered at position 122, located at r=20 mm away from the asphere's axis of symmetry 112. While the local slope varies across the part as shown in FIG. 8d, it is nominally constant along any particular ring about the axis of symmetry, such as ring 126 located r=20 mm away from the axis of symmetry 112. The nominal shape and slope will be the same for any measurement region 124 taken with center 122 on ring 126, provided that the displacement from center 122 relative to the gauge is kept constant (i.e. no longitudinal translation). FIG. 9a illustrates this, and includes a small defect (deviation from the desired aspheric shape) 145. Consider further FIG. 9b, which is a profile of a reference surface that is perfect except for a small defect 143. When measuring an aspheric surface against a spherical wavefront as shown in FIG. 7d, the emitted light 133 and reflected light 135 do not match in optical path. Thus any defects from the gauge, such as 143, will have a different effect dependent on the reflected light 135. Thus the actual measurement would look like FIG. 9c if 143 were the only gauge defect—notice that defect 143 was split into two parts (one that added in the same location as test surface defect 145 and one that is sheared due to the displacement of the reflected wavefront 135). Thus the measurement shown in FIG. 9c is not an accurate representation of the surface shown in FIG. 9a. It is worth noting that the prior art average method would return a calibration profile something like that of 9b, which would not actually compensate the actual gauge error due to the reflected light taking a different path than used in the calibration.

Figure 9D:
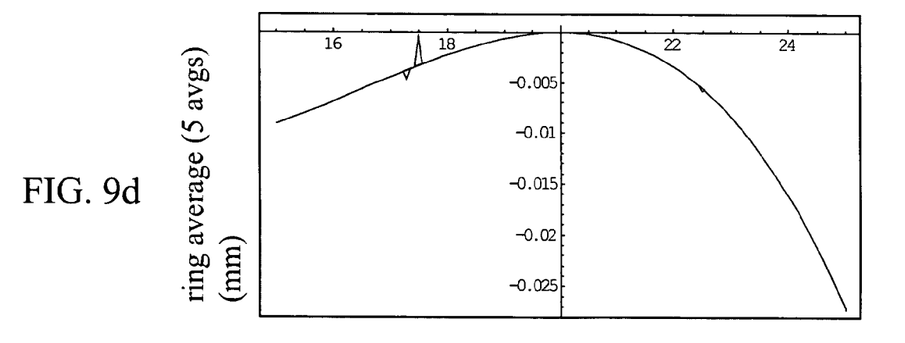
FIG. 9d is a sample ring-average calibration, in this example comprising the average of 5 noise-free measurements at different positions along the 20 mm ring of symmetry of the asphere.
Figure 9E:
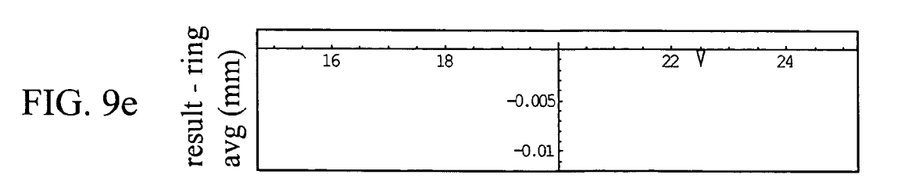
FIG. 9e is an example of a measurement that directly employs a ring average calibration (subtracting the calibration results in FIG. 9d from the surface measurement in FIG. 9c)

A plurality of measurements can be taken on different positions along a ring (which will exhibit approximately the same profile for reflected light 135) and averaged to provide an estimate of the systematic wavefront error for measurements taken on that ring. The errors systematic with slope and space will remain the same across measurements, while deviations from the test surface will tend to average out. FIG. 9d demonstrates the result of 5 measurements made at different positions along the ring and averaged; the defects from the reference surface (and any of the other interferometer optics, assumed perfect in this example) remain, but the test surface defects are averaged. The resultant ring average can then be subtracted from the test measurement to obtain a better estimate of test surface defects. For example, FIG. 9e is the result of subtracting FIG. 9d from 9c, and effectively separates the defect 145 on the surface from gauge defect 143. Note that alignment errors (such as tilts and translations) will alter the slope distribution in a measurement, and thus the systematic wavefront error as well. Therefore the same amount of alignment error should be present in each of the measurements used to calculate the calibration, and any measurements that use the calibration should also have that amount of alignment error present (i.e. same nominal confocal position for all measurements to be averaged). Variation in alignment error will reduce the quality of the calibration.

Figure 7B:
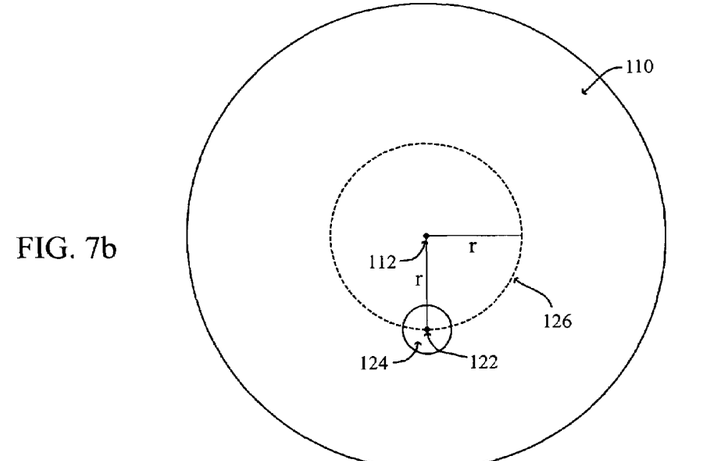
FIG. 7b is a view of the example asphere shown in FIG. 7a taken parallel to its axis of symmetry (top view)

Although the example asphere used in FIGS. 7-9 is fully symmetric rotationally, this is not a necessary feature of the invention. The invention applies to any test surface or wavefront with underlying symmetry, the only requirement being that the nominal shape of the part be identical at multiple positions on the part surface (thus allowing spatial averaging of test part errors to occur in areas where the surface slope profile is nominally the same). Off-axis sections of aspheres can employ averaging over subapertures distributed along "arcs" of subapertures, acylinders can employ lines, while torics can employ either rings or parts of rings. More unusual symmetries are also possible, such as 4 point (reflection symmetry along both the X and Y axes), where only 4 measurements can effectively contribute to each calibration point of interest (but 4 is better than 1!).

A method for calculating systematic gauge wavefront error in accordance with the invention comprises the steps of:
1. identifying the symmetry of said surface or wavefront (e.g. what locations on the test part have the same prescribed shape);
2. selecting the gauge and test part measurement conditions under which to calibrate (unlike the usual low-order calibrations of the prior art, accurate calibration of higher spatial frequency features can be quite sensitive to gauge parameters, such as position of the focusing stage), in particular the position(s) on the part that are of interest (e.g. in the previous example, any position on the ring 20 mm away from the axis was deemed "of interest");
3. acquiring measurements at different relative positions of the part and gauge wherein the measurements meet the desired test conditions and have identical nominal measurements (prescribed measurements are the same, though manufacturing defects on the test part will in fact cause the actual measurements to differ somewhat); and
4. calculating a calibration of the systematic gauge wavefront error from said measurements.

The simplest calculation is to just average all the acquired measurements together. More elaborate computations that employ a priori knowledge are of course possible. For example, if a data point were known (or suspected) to have a lower signal to noise ratio that another point, it could be weighted or even discounted in the average. Furthermore, a point in the calibration itself can be discounted if it does not achieve a certain confidence (e.g. at least 4 "good" points is required before the calibration at that point is considered valid). Other processing is possible to separate spatial components that are ill-determined, which are described further in the next few paragraphs.

Although this method is a significant improvement for aspheric measurements, it has two disadvantages compared to the standard average method: it is less efficient, and it confounds the measurand with the error bias for certain symmetries. The efficiency loss is relatively obvious: a calibration valid for one "ring" cannot generally be applied to another ring having different local principal radii of curvature, while a standard average calibration is valid for any and all positions of a test sphere. This is a necessary consequence of an asphere having intrinsically less symmetry than a sphere. The error confounding issue also emerges naturally from the symmetry of the average. If the surface/wavefront to be tested has features with the same symmetry as the part prescription, they will persist in a simple average of the measurements. Effectively, the assumption that the part form varies across measurement position has been violated.

A further aspect of the present invention is the application of a priori knowledge and assumptions to help address the confounding problem. The source of any "symmetric component" (e.g. portion of the measurements that is symmetric about the ring for rotationally symmetric aspheres) of the average is ambiguous (it could come from either gauge bias or the part under test). Such symmetric components of the measurement are present in the average, and thus by default are assumed to be part of the systematic error in the wavefront measurement (rather than a feature on the part). Note that this includes the rotationally symmetric form of the aspheric shape ("known" to be on the part and not part of the system error)—as illustrated in FIG. 9d, and thus FIG. 9e does not include the aspheric form! Although the calibration cannot distinguish symmetric components of the test from those of the reference wavefronts, the resultant average may be post-processed in order to assign certain features to the test part rather than the systematic error. Some useful post-processing includes (but is not limited to) removal of all symmetric components or removal of some filtered version of the symmetric components. What is "useful" depends on both the application and what other techniques complement the process (such as further elements of the present invention, discussed herein below). For example, if the goal of the measurement were to highlight any groove structures on the part, a high-pass filtered version of the symmetric component might be removed from the average. In this way, any grooves present in the average would be assumed to be from the part surface rather than assigned to the calibration. Although it might also be "known" that aspheric shape is on the part, it could be convenient to assign it to the calibration to highlight the groove structure. It is easier to see the surface defect 145 present in FIG. 9e, for example, because the surface form has been subtracted out with the average. So although it is not "correct" to assign the error in this fashion, it does provide a more convenient analysis for some defects and therefore may be preferred to arbitrarily assign test surface form to the calibration in such instances.

A more direct solution of the confounding problem involves exploiting the rotational symmetry of the gauge to isolate a rotational average of the part's shape within any given subaperture. This can be achieved by capturing multiple data sets with the part rotated about the gauge's axis of symmetry to a number of different positions. These rotations are individually removed in software so that the part appears to have a fixed orientation in all the data maps. It is evident that the average of the resulting maps suppresses the spatially inhomogeneous contributions from the gauge and provides improved access to the features on the test part/wavefront. In this way, it becomes possible to go on to extract an explicit estimate of the part's contribution to the confounded symmetric error that was discussed above. The sources of the confounded error are thus disambiguated, and the effects can be allocated accordingly.

The average method seeks to average out any effects of the test part in order to get an estimate of the systematic wavefront bias for a particular wavefront slope distribution. Thus the output of the method is a calibration map; FIG. 9d demonstrates a linear profile of such a map that can be subtracted from further measurements (such as FIG. 9c) to obtain a more accurate estimate of the test surface with at least some of the wavefront bias removed (such as FIG. 9e). The present invention provides another extension to the prior art average technique that seeks to measure the test surface, rather than the wavefront bias (averaging out systematic wavefront error instead of the test surface).

The concept is that while such wavefront errors are constant for a particular wavefront slope distribution, they will vary with the slope. Thus there is potential to reduce such errors by averaging measurements of the same location of the part, but through different portions of the gauge. FIG. 7d illustrates a reflected wavefront 135 that is specific to a particular position of the surface 110. It is possible to measure what is more or less the same region 124 with center 122 but positioning the part tilted and/or longitudinally displaced (resulting in different alignment terms and the reflected wavefront 135 taking a different path through the gauge). Multiple measurements of the desired measurement region are made such that each measurement has different alignment terms (tilts and translations). Tilt is defined herein as the departure of the test surface from orthogonality to the incident beam to surface 110 at position 122, or departure of the test surface from parallelism to the wavefront. Since the spatial profile of the systematic error will vary with input wavefront slope, that error will be averaged out to some extent (increasing the fidelity of the test surface measurement). Again, this method is most applicable to measurement of higher spatial frequencies on an aspheric wavefront. It is possible to combine this technique with ring averaging, and it is also possible to incorporate rotations of the part about the gauge's axis of symmetry much as in the discussion of the disambiguation of the previously confounded error.

The previously described elements of the present invention are particularly effective at reducing higher spatial frequency wavefront errors induced by the wavefront-measuring gauge. They are less practically effective for reducing low spatial frequency errors. Often other techniques are effective at measuring low spatial frequency errors, and the tolerances for lower frequencies are often looser as well. Accurate subaperture stitching of the higher spatial frequency data, however, can be limited by low spatial frequency inaccuracies. When stitching, any uncompensated error will cause inconsistency in regions of overlap. When such errors are of low spatial frequency, they tend to cause stitching artifacts (steps) at the edges of the subaperture. Since such artifacts have a broad frequency spectrum (both low and high frequency components), stitching can cause low frequency error to adversely affect mid-frequency performance.

Additional elements of the present invention can alleviate this problem. By removing any low spatial frequency information from the subaperture data (including any actually present in the test wavefront), the potential for low frequency error to induce stitching artifacts is reduced. Such filtering must be performed carefully, particularly in cases where there is actually low spatial frequency error in the test wavefront, as resultant differences in the subapertures will induce stitching artifacts. Some methods include fitting (and removing) polynomial terms and frequency domain (Fourier) filtering.

Further improvement is possible if the low-frequency removal does not sufficiently suppress stitching artifacts. Instead of simply removing the low frequency form, it is optimized to minimize any mismatch between subapertures (thereby reducing stitching artifacts). Low frequency terms are assigned free compensators in accordance with U.S. Pat. No. 6,956,657, the relevant disclosure of which is incorporated herein by reference, which are individually optimized during the stitching computation to minimize any data mismatch. One possible implementation is shown in Equation 3, where individual Zernike polynomial terms are included as free compensators.

$$f_j(x, y) + \sum_k a_{jk} Z_{jk}(x, y), \quad \text{Equation 3}$$

note the Zernike polynomials can have a dependence on subaperture index (j) because the mapping of the subapertures into the part coordinate system can distort them. It is understood that the present invention is not limited in scope to any particular representation of the low frequency terms; other forms (such as Fourier coefficients) are also possible. What is important is that the representation captures the low frequency variation that is causing stitching artifacts.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a metrology system including a part-positioning means and a wavefront-measuring gauge, a method for obtaining high-accuracy measurements of surfaces or wavefronts with underlying symmetry in a design prescription, the method comprising the steps of:
   a) acquiring a plurality of measurements at different relative positions of said part and gauge, and
   b) performing at least one of the following steps:
      i) determining said gauge's optimal focus position for each of said measurements using knowledge of the local curvature of each test wavefront in said design prescription and gauge calibration constants;
      ii) calibrating systematic gauge wavefront error in said measurements, by averaging said measurements having the same test conditions of said gauge and the positions of said measurements to average follow said symmetry, such that said gauge measurements at all of said positions would be identical if said part were perfectly matched to said design prescription;
      iii) reducing uncalibrated error by averaging said measurements obtained at the same nominal location of the test part, but where two or more of said measurements have different orientations relative to said gauge; and
      iv) reducing uncalibrated error by stitching said measurements together, where low spatial frequency information in said measurements is explicitly filtered out or compensated implicitly with free compensators.

2. In a metrology system including a part-positioning means and a wavefront-measuring gauge having a focusing stage and a plurality of constant first-order properties, a method for determining the first-order optical properties of the wavefront-measuring gauge and imaging conjugates as described by the $$\frac{1}{ob + ob\_ref} + \frac{1}{im + im\_ref} = \frac{1}{f},$$

the method comprising the steps of:
   a) determining "ob_ref", the offset from an object reference point to a first principal plane within said gauge;
   b) determining "ob", the displacement from a test surface to said object reference point;
   c) determining "im_ref", the displacement from an F-axis mechanical origin Fo to a second principal plane within said gauge;
   d) determining "im", the position of the F-axis within the gauge; and
   e) determining "f", the focal length of the gauge's optical system.

3. A method in accordance with claim 2 comprising the steps of:
   a) setting up said wavefront-measuring gauge in the desired optical configuration;
   b) setting up a sample part with a surface of known radius and known displacement from its confocal position in said metrology system;
   c) adjusting the position of said focusing stage until said surface is observed to be in sharp focus;
   d) recording the resulting pair of conjugate locations comprising the position of said focusing stage and the position of said part with respect to said known object reference point;
   e) repeating steps b) through d) to obtain a plurality of different pairs of said conjugate locations; and
   f) performing a fitting calculation on said pairs of conjugate locations by solving for said plurality of constant first-order properties of the gauge optical system, including at least the focal length, displacement from the object reference point to the first principal plane, and displacement from the focusing stage origin to the second principal plane.

4. A method in accordance with claim 2 for determining the position of the focusing stage such that the gauge is focused on a particular location, comprising the steps of:
   a) calculating the object conjugate position of said particular location, based on knowledge of the local radius of curvature of the test wavefront and the position of the wavefront with respect to an object reference point and the first principal plane of said gauge's optical system;
   b) calculating the image conjugate position, based on said object conjugate position and the known focal length of said gauge's optical system; and
   c) calculating a focusing stage position wherein said gauge is focused onto said particular location, based on said image conjugate location and the known displacement from the origin of said focusing stage to the second principal plane of said gauge's optical system.

5. In a metrology system including a part-positioning means and a wavefront-measuring gauge, a method for estimating and calibrating the systematic gauge wavefront error when testing a specific surface or wavefront of a part having underlying symmetry in a design prescription, the method comprising the steps of:
   a) identifying said symmetry of said surface or wavefront;
   b) selecting the gauge and test part measurement conditions under which to calibrate, including gauge configuration and position of said part;
   c) acquiring a plurality of measurements at different relative positions of said part and gauge wherein said measurements meet said test conditions and said positions follow said symmetry, such that said gauge measurements at all of said positions would be identical if said part were perfectly matched to said design prescription; and
   d) calculating a calibration of the systematic gauge wavefront error from said measurements.

6. A method in accordance with claim 5 wherein said test part is rotationally symmetric about an axis, said plurality of measurement positions are on a ring about said axis, and said calibration calculation is an average of said measurements.

7. A method in accordance with claim 6 wherein said average is selected from the group consisting of simple and weighted.

8. A method in accordance with claim 5 wherein said calibration calculation employs knowledge about said measurements, and wherein said method comprises the further steps of:
   a) computing a weighted average of said measurements, said weights being determined by an estimate of measurement data quality; and
   b) removing features that possess symmetry identical to that of said test part over a desired spatial band from said average.

9. A method in accordance with claim 5, wherein said gauge has underlying symmetry, comprising the additional steps of:
   a) identifying said symmetry of said gauge;
   b) acquiring a plurality of measurements at different relative orientations of the gauge with respect to the part wherein said positions follow said symmetry, such that said gauge measurements at all of said orientations would be identical if said part were perfectly matched to said design prescription;
   c) calculating the gauge-symmetric contribution to the systematic gauge wavefront error from said measurements; and
   d) separating the part's contribution from the confounded symmetric error in said calibration of the systematic wavefront error.

10. In a metrology system including a part-positioning means and a wavefront-measuring gauge, a method for reducing the effects of systematic gauge wavefront error when testing a specific surface or wavefront from a part, the method comprising the steps of:
   a) selecting a nominal position on said part to measure;
   b) acquiring a plurality of measurements at said nominal position, said measurements having data points in common, wherein each of said measurements differs from said other measurements in at least one of position and orientation; and
   c) averaging said measurements to form a common coordinate system, whilst accounting for any relative translations in said different measurements.

11. A method for synthesizing a full-aperture numerical data map of a test surface of an object from a plurality of overlapping subaperture data maps of said surface, comprising the steps of:
   a) selecting at least one method for reduction of measurement error in said subaperture data maps;
   b) collecting said plurality of subaperture numerical data maps of said surface from a plurality of regions of said surface, at least a portion of each such map overlapping a portion of at least one adjacent map to create a region of overlapping data;
   c) projecting said plurality of overlapping data maps onto a global coordinate system with a nominal distortion map;
   d) selecting a plurality of error compensators from at least one of two groups consisting of free compensators having free amplitude range and interlocked compensators having identical constrained amplitudes to compensate for stitching errors in said overlapping data regions; and
   e) simultaneously minimizing mismatch of data from each of said data maps in said overlapping regions through linear combinations of said compensators.

12. A method in accordance with claim 11, wherein said systematic gauge error reduction method includes prefiltering said subaperture data, said filtering occurring after said subaperture data collection step but prior to said mismatch minimizing step, wherein said prefiltering removes low spatial frequency form from said subaperture data.

13. A method in accordance with claim 11, wherein said measurement error reduction method includes optimization of low spatial frequency deviations in said overlapping measurement regions wherein said low spatial frequency deviations are represented by mathematical basis functions, each such basis function being represented by a free compensator.

14. A method in accordance with claim 11 wherein said measurement error reduction method includes averaging of slope-dependent errors wherein said subaperture data maps include overlapping data of different local slopes at the same point in the overlapping map to average slope-dependent systematic errors of said gauge.

* * * * *